(12) United States Patent
Thompson et al.

(10) Patent No.: US 7,543,168 B1
(45) Date of Patent: Jun. 2, 2009

(54) SPECIFYING AN OPERATING SYSTEM LEVEL TO USE AFTER REBOOT

(75) Inventors: James W. Thompson, West Chester, PA (US); Joseph P. Neill, East Fallowfield, PA (US); Richard L. Furbee, West Chester, PA (US); Randolph C. Reist, Royersford, PA (US); Joseph Lerch, III, Pottstown, PA (US)

(73) Assignee: Unisys Corporation, Blue Bell, PA (US)

( * ) Notice: Subject to any disclaimer, the term of this patent is extended or adjusted under 35 U.S.C. 154(b) by 432 days.

(21) Appl. No.: 11/079,698

(22) Filed: Mar. 14, 2005

(51) Int. Cl.
*G06F 9/24* (2006.01)
*G06F 9/44* (2006.01)
*G06F 9/445* (2006.01)
*G06F 15/177* (2006.01)

(52) U.S. Cl. .............. 713/323; 713/1; 713/2; 713/100; 717/168; 717/169; 717/170; 717/174; 717/175

(58) Field of Classification Search ............ 713/1, 713/2, 100, 323; 717/168, 169, 170, 174, 717/175
See application file for complete search history.

(56) References Cited

U.S. PATENT DOCUMENTS

| | | | |
|---|---|---|---|
| 5,732,275 A * | 3/1998 | Kullick et al. | 717/170 |
| 6,976,065 B2 * | 12/2005 | Kaiser et al. | 709/221 |
| 7,047,403 B2 * | 5/2006 | Lin | 713/100 |
| 2004/0210848 A1 * | 10/2004 | Vineyard et al. | 715/810 |

* cited by examiner

*Primary Examiner*—Thomas Lee
*Assistant Examiner*—Michael J Brown
(74) *Attorney, Agent, or Firm*—Richard J. Gregson; Volpe and Koenig P.C.

(57) ABSTRACT

A method for specifying an operating system (OS) file to use in a computing system after a system reboot begins by copying at least one new OS file to a system disk. An OS file to be installed is selected from the new OS files on the disk. The system is booted into the selected OS file, the selected OS file becoming the currently running OS on the system. A boot pointer on the system disk is updated to point to the selected OS file, such that any subsequent reboot will be into the selected OS file.

13 Claims, 10 Drawing Sheets

SPECIFYING AN OPERATING SYSTEM LEVEL TO USE AFTER REBOOT

FIELD OF INVENTION

The present invention relates generally to computer operating systems, and more particularly, to a method and system for specifying the operating system level to be used after the system reboots.

BACKGROUND

In an "always on" computer system, such as a banking system, one goal is to improve the availability metric. For example, an availability of 99.99% is 52 minutes, 24 seconds per year that the system is down, and 99.999% availability is 5 minutes, 15 seconds of downtime per year. Higher availability translates into better system reliability. There are many different methods available to reduce a system's downtime, and reducing the number of system boot cycles is one such method. Intentional reboots are a leading concern related to downtime. In a mission-critical setting, any extended downtime can lead to large losses in terms of data integrity, customer satisfaction, or a company's revenue.

Any type of upgrade to a computer's operating system (OS) requires some downtime to install. An OS upgrade is also referred to herein as "installing a new software level". During the course of a single year, several types of upgrades may be issued, including, for example, bug fixes multiple times per year, minor or support releases once or twice a year, and major upgrades once a year. Even in an ideal setting, installing several upgrades during the course of a year will likely lead to more than five minutes of downtime.

A user will generally install a new software level in two situations: when the new software level contains a new feature the user wants, or when the new software level contains a bug fix that the user needs. The user must choose an opportune time to incur a system interruption to install the new software level. In the meantime, a problem may cause an unscheduled system reboot. Presently, this kind of unscheduled reboot returns the OS to the existing software level, and the user must still perform a scheduled reboot to install a new software level (i.e., a bug fix) to address the problem.

The bug fix problem is particularly troublesome when the bug causes an unscheduled reboot. Installing the bug fix causes a guaranteed reboot, but not installing the bug fix represents a potential reboot. Therefore, many users risk not installing a fix and gamble that they will not encounter the problem. If the fatal bug is encountered, the user has incurred a reboot but is still running their system on the OS level containing the bug. The user must reboot again in order to install the bug fix.

Users that regularly install new bug fix levels encounter fewer unscheduled system interruptions, but increase their overall downtime. The unscheduled interrupts frequently relate to problems that already have an available bug fix. Combining all of these cases shows that system downtime could be reduced if a system interruption brought the user up to a new software level containing the features or bug fixes that they desire.

SUMMARY

The present invention allows users to request a future installation of a new OS level without any observable interruption in the system. The system can then run for however long it may take before the next reboot (which on some systems, could be several years). This pending OS level change can be canceled or updated to an even newer software level (e.g., a more recent bug fix level supersedes the pending level). Alternatively, when the currently running OS level does not meet the user's expectations, the user can return to an earlier OS level, but wait until the next reboot (scheduled or unscheduled) to do so.

By utilizing the present invention, users do not have to choose between a potential reboot due to a known bug and incurring an immediate reboot to install the bug fix. A user can specify the latest level of fixes or a new feature release, but not incur a system interruption until some event causes the system to reboot. The present invention also potentially increases user satisfaction with the system, by informing the user that a fix to the problem they just encountered has already been installed as part of the reboot caused by the bug.

A method for specifying an operating system (OS) file to use in a computing system after a system reboot begins by copying at least one new OS file to a system disk. An OS file to be installed is selected from the new OS files on the disk. The system is booted into the selected OS file, the selected OS file becoming the currently running OS on the system. A boot pointer on the system disk is updated to point to the selected OS file, such that any subsequent reboot will be into the selected OS file.

A system for implementing a delayed switch from a first operating system (OS) file to a second OS file in a computing system after reboot includes a disk and a boot process. The disk has the first OS file, the second OS file, and a boot strap area with a pointer that points to the first OS file. After the second OS file is installed, the pointer is updated to point to the second OS file, such that on system reboot, the boot process accesses the pointer in the boot strap area to load the second OS, thereby switching the system from the first OS to the second OS.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Figure 1:
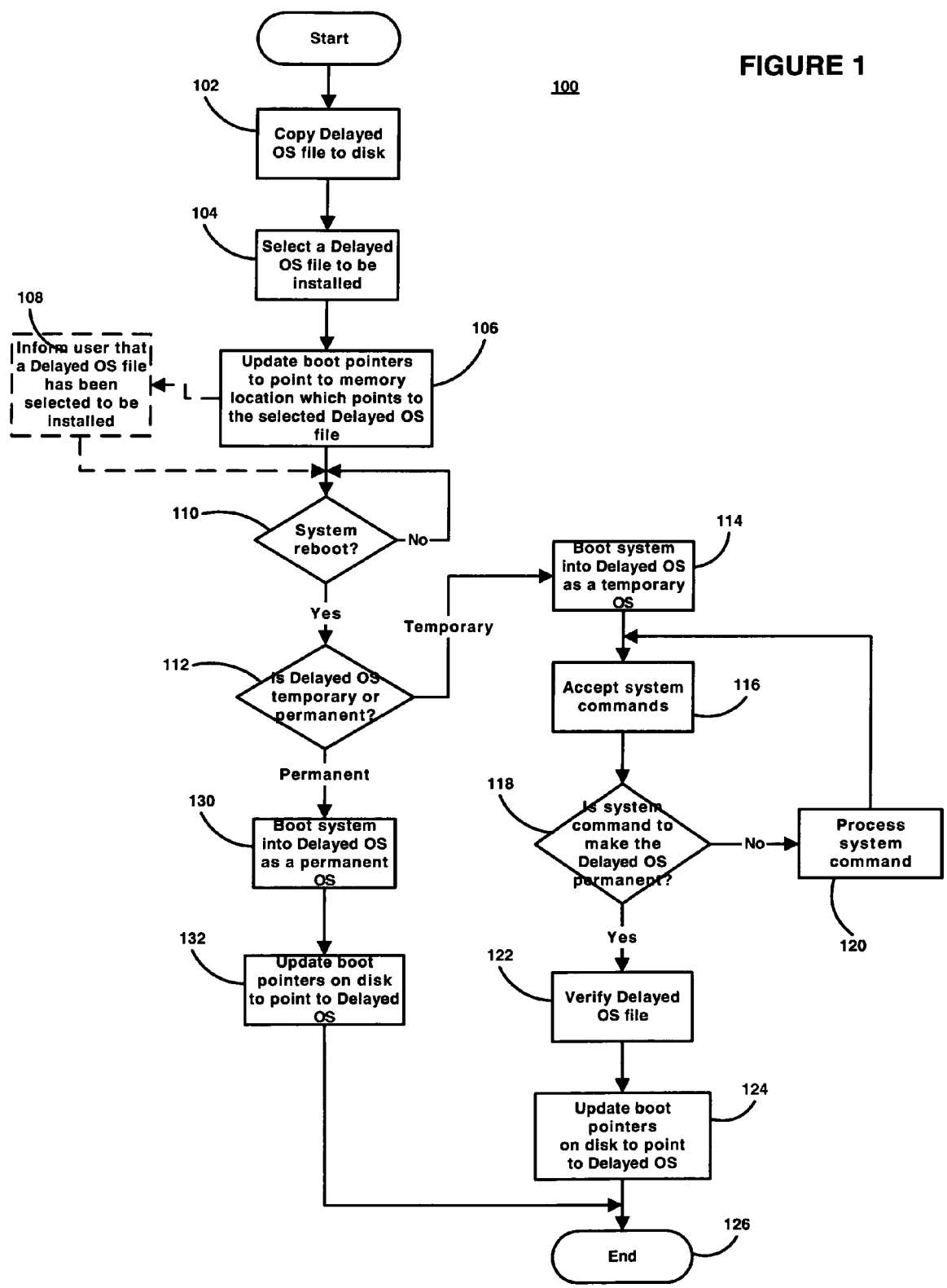
FIG. 1 is a flowchart of a method for installing a delayed upgrade to an operating system in accordance with the present invention.

A method 100 for installing a delayed OS upgrade in accordance with the present invention is shown in FIG. 1. The method 100 begins by copying a Delayed OS file (i.e., the upgrade) to a system disk (step 102). Because the Delayed OS is copied to the system disk and not yet installed, a number of different Delayed OSes can be copied to the system disk or exist on the system disk without causing any problems.

The user selects a Delayed OS file to be installed (step 104). The system's boot pointers are updated to point to a memory location that points to the selected Delayed OS file (step 106). The presence of the Delayed OS can be indicated, for example, by a flag in the boot area of the system. As an optional step, the user can be informed that a Delayed OS file has been selected to be installed (step 108). The system continues to operate under the current OS and detects whether the system has been rebooted (step 110). When the system is rebooted, a determination is made whether the selected Delayed OS should be loaded as a temporary OS or as a permanent OS (step 112).

If the selected Delayed OS is to be loaded as a temporary OS, the system is booted into the Delayed OS, which is run as a temporary OS (step 114). The reason for running the Delayed OS as a temporary OS is to permit the user to determine whether the Delayed OS is acceptable for operation. With the Delayed OS operating, it is ready to accept system commands (step 116). If the system command is not to make the Delayed OS permanent (step 118), then the system processes the command as it would with any other system command (step 120) and continues to accept commands (step 116).

If the system command is to make the Delayed OS permanent (step 118), then the Delayed OS file is verified to ensure that it is not corrupted (step 122). It is noted that the verification step (step 122) is performed as a "sanity check" of the OS file, and can be skipped. The boot pointers stored in the boot strap area (BSA) on disk for the permanent OS are updated to point to the Delayed OS, since the Delayed OS is now the permanent OS (step 124), and the method terminates (step 126).

The BSA maintains a pointer to the OS file to load, and the BSA is stored in a particular area on the disk. When the Delayed OS is installed, a soft boot pointer is set to point to the Delayed OS file such that when the soft boot is initiated, the Delayed OS is loaded as a temporary OS. While the Delayed OS is running as a temporary OS, any type of system reboot will look to the BSA stored on disk to locate the permanent OS file. Essentially, making the Delayed OS the permanent OS requires updating the boot pointer on disk to point to the Delayed OS.

If the selected Delayed OS is to be loaded as a permanent OS (step 112), the system is booted into the Delayed OS as a permanent OS (step 130). The boot pointers stored in the BSA on disk for the permanent OS are updated to point to the Delayed OS, since the Delayed OS is now the permanent OS (step 132), and the method terminates (step 126).

In an alternate embodiment of the present invention, the Delayed OS can be automatically hardened from the temporary OS (i.e., made permanent) by the system, without further intervention by the user. The criteria to be applied for the automatic hardening can be supplied by the user when the Delayed OS upgrade is installed, or can be supplied at a later time. For example, the user could specify that if the system runs the Delayed OS as a temporary OS for a predetermined period of time (e.g., three days) without any errors, then the OS upgrade should be made permanent. As another example, the user could specify that if the reboot (step 110) is caused by a bug that the Delayed OS repairs, then the reboot into the Delayed OS should be as a permanent OS, in order to avoid having the bug occur another time and causing an additional reboot.

The criteria to be evaluated can be open-ended, including, but not limited to, the length of runtime without errors, a certain number errors over a given period of time, or the types of errors that can be permitted to occur. In addition, the criteria selected can be combined or performance thresholds can be established, such that the user can customize the determination whether to automatically harden the OS upgrade. If the selected criteria are not met, or if a certain trigger condition is met, then the automatic hardening process is deactivated and the user can manually harden the OS upgrade.

Regardless of the criteria selected for the automatic hardening, the user is also able to deactivate the automatic hardening, such that a manually initiated hardening process would be required. The reason for this escape process is that the system may be running close to the threshold criteria specified by the user, but not sufficiently above the threshold to satisfy the user. For system integrity, it is better to provide the user with a way out of the automatic hardening process, than to force the user to accept a hardening he or she may be uncomfortable with.

EXAMPLE

Figure 2A:
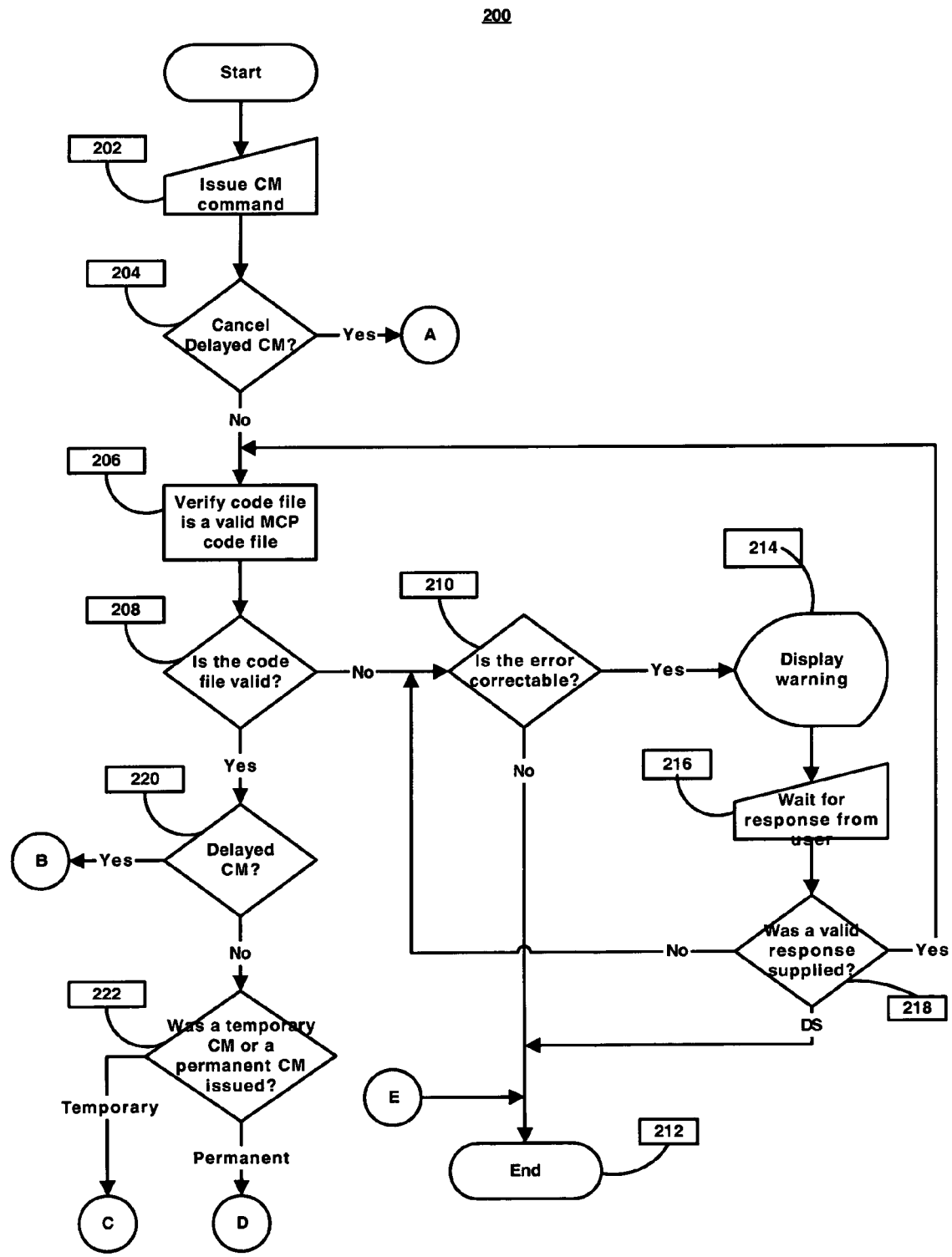
FIGS. 2a-2c show a flowchart of the method shown in FIG. 1 as applied to the MCP operating system.
Figure 2B:
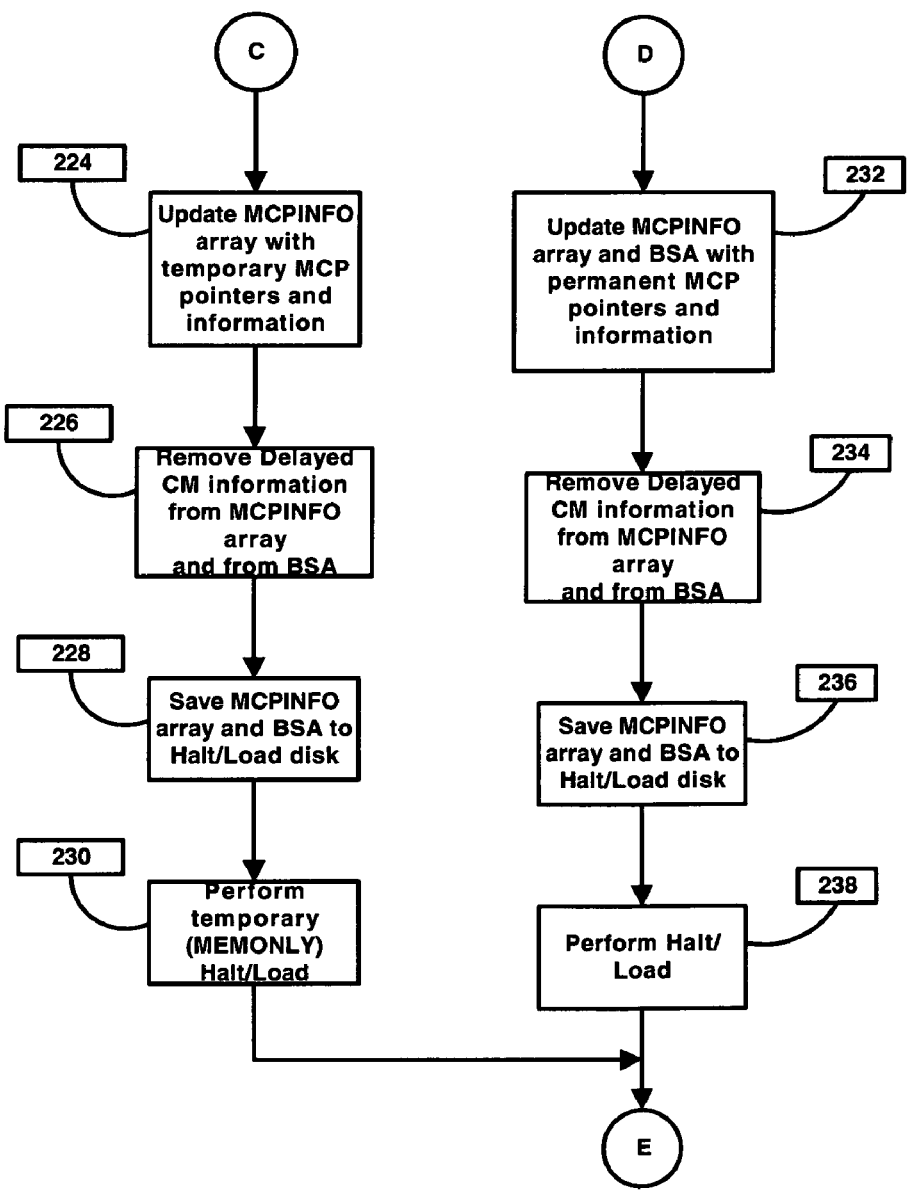
Figure 2C:
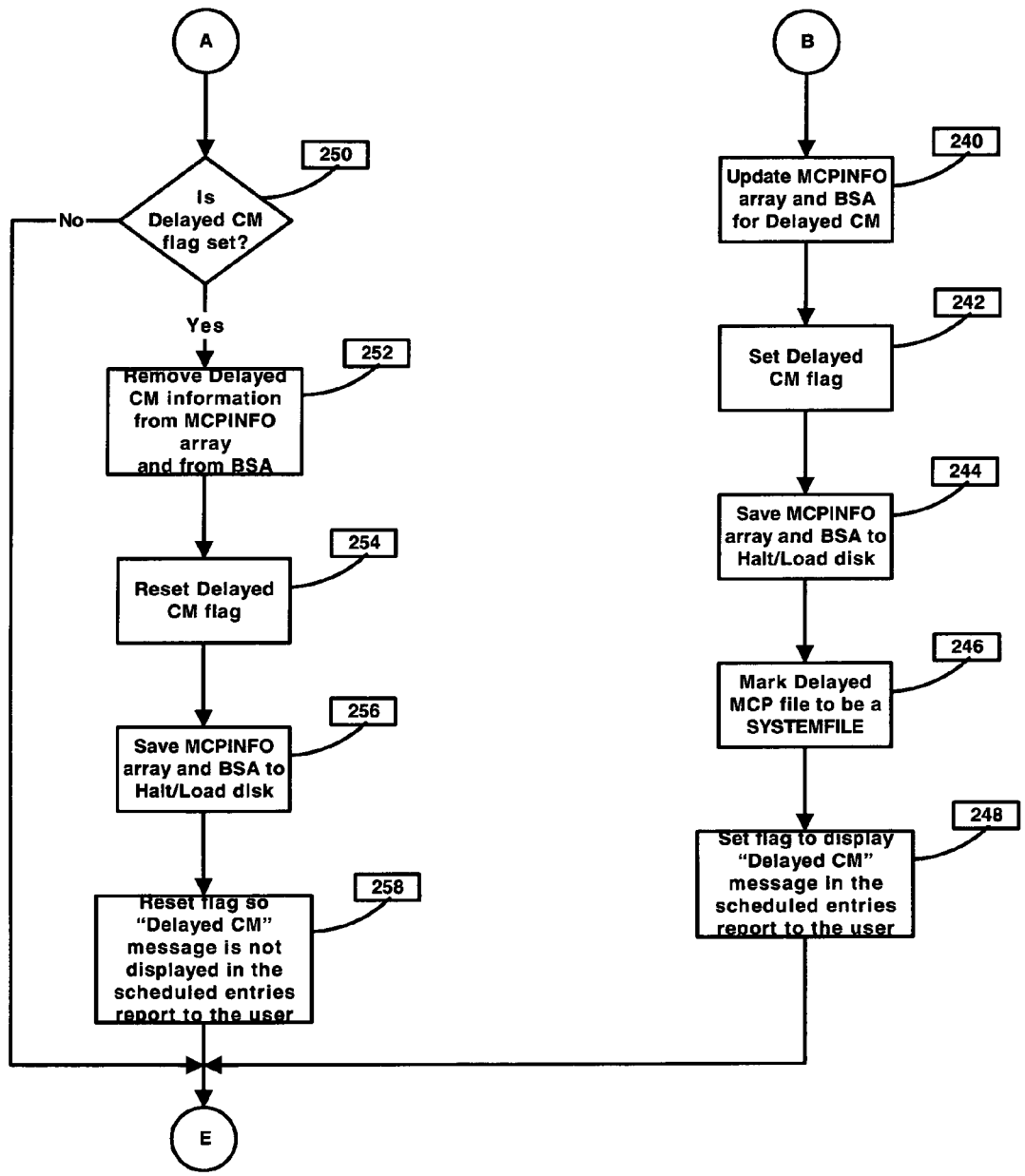

An example of the method 100 as applied to the MCP OS is shown as a method 200 in FIGS. 2a-2c. However, the inventive principles disclosed herein can be applied to any OS upgrades. The method 200 begins by issuing a change MCP (CM) command (step 202). A determination is made whether the CM command is to cancel a pending Delayed CM (step 204).

If the CM command is not to cancel a Delayed CM, then the code file identified in the CM command is verified to determine if it is a valid MCP code file (step 206). If the code file is not valid (step 208), then a determination is made whether the error is correctable (step 210). Certain types of errors can be corrected by the user, such as a typographical error in a file name and the system cannot locate the file due to the error. Other types of errors are not correctable, such as an MCP that is not proper for the machine on which it's running; e.g., the wrong microcode for the hardware.

If the error is not correctable, then the method terminates (step 212). If the error is correctable (step 210), then a warning is displayed prompting the user to identify a valid code file (step 214). The system then waits for a response from the user (step 216). When the user supplies a response, a determination is made whether that response is valid (step 218). If the response is not valid, then the method determines if the invalid response is a correctable error (step 210), as described above. If the response is valid (step 218), then the newly identified code file is verified to see if it is a valid MCP code file (step 206), as described above. If the user enters a discontinue (DS) command as a response (step 218), then the method terminates (step 212). It is noted that while waiting for a response from the user (step 216), the system can wait indefinitely; while the system waits for a response from the user, it can perform other tasks, and will not sit idle until a response is received.

If the code file is valid (step 208), then a determination is made whether the valid MCP file is for a Delayed CM (step 220). If the MCP file is not for a Delayed CM, then a determination is made whether the CM command was for a temporary CM or a permanent CM (step 222). If the command was for a temporary CM, then an information array (MCPINFO) is updated with pointers and other information relating to the memory location pointing to the temporary MCP (step 224). MCPINFO contains information relating to the current running OS instance and is used by the boot process to identify the location of the temporary MCP file.

The Delayed CM information is removed from the MCPINFO array and from the BSA (step 226). The MCPINFO array and the BSA are saved to the Halt/Load disk (step 228), a boot (Halt/Load) into the temporary MCP is performed (step 230), and the method terminates (step 212). The temporary MCP is stored on disk, and the boot information required to access the temporary MCP is stored in memory. This boot information includes the location of the temporary MCP file, so that the BSA that is stored on the disk does not need to be accessed. The system then operates normally with the temporary MCP.

If the CM command was for a permanent CM (step 222), then the MCPINFO array and the BSA are updated with permanent MCP pointers and information (step 232). The Delayed CM information is removed from the MCPINFO array and from the BSA (step 234). The Delayed CM information is removed because any permanent CM wipes out any pending Delayed MCP. The MCPINFO array and the BSA are saved to the Halt/Load disk (step 236), the system reboots (Halt/Load) from the disk (step 238), and the method terminates (step 212).

After the Halt/Load (steps 230 or 238), the system operates normally under the OS, regardless of whether it is temporary or permanent.

If the MCP file is for a Delayed CM (step 220), then the MCPINFO array and the BSA are updated with information relating to the Delayed CM (step 240) and the Delayed CM flag is set (step 242). The Delayed CM flag is a standalone variable that is not preserved across Halt/Loads, meaning that the flag is cleared when the system Halt/Loads. This is because when the system Halt/Loads, if it does not Halt/Load into the Delayed MCP, the Delayed MCP information is no longer needed. The MCPINFO array and the BSA are saved to the Halt/Load disk (step 244) and the Delayed MCP file is marked as a SYSTEMFILE to prevent it from being deleted (step 246). A flag is set to display a "Delayed CM" message in the scheduled entries report to the user (step 248) and the method terminates (step 212). A scheduled entry is a pending task that is not currently running, and the scheduled entries report is displayed as a piece of information to the user.

If the CM command is to cancel a Delayed CM (step 204), then a determination is made whether the Delayed CM flag is set (step 250). If the Delayed CM flag is not set, this indicates that there is no pending Delayed CM and the method terminates (step 212). If the Delayed CM flag is set, this indicates that there is a pending Delayed CM, and the Delayed CM information is removed from the MCPINFO array and from the BSA (step 252). The Delayed CM flag is reset (step 254) and the MCPINFO array and the BSA are saved to the Halt/Load disk (step 256). The "Delayed CM" message flag is reset, so that the "Delayed CM" message is not displayed in the scheduled entries report to the user (step 258). The method then terminates (step 212).

Booting into the Delayed OS

Figure 3:
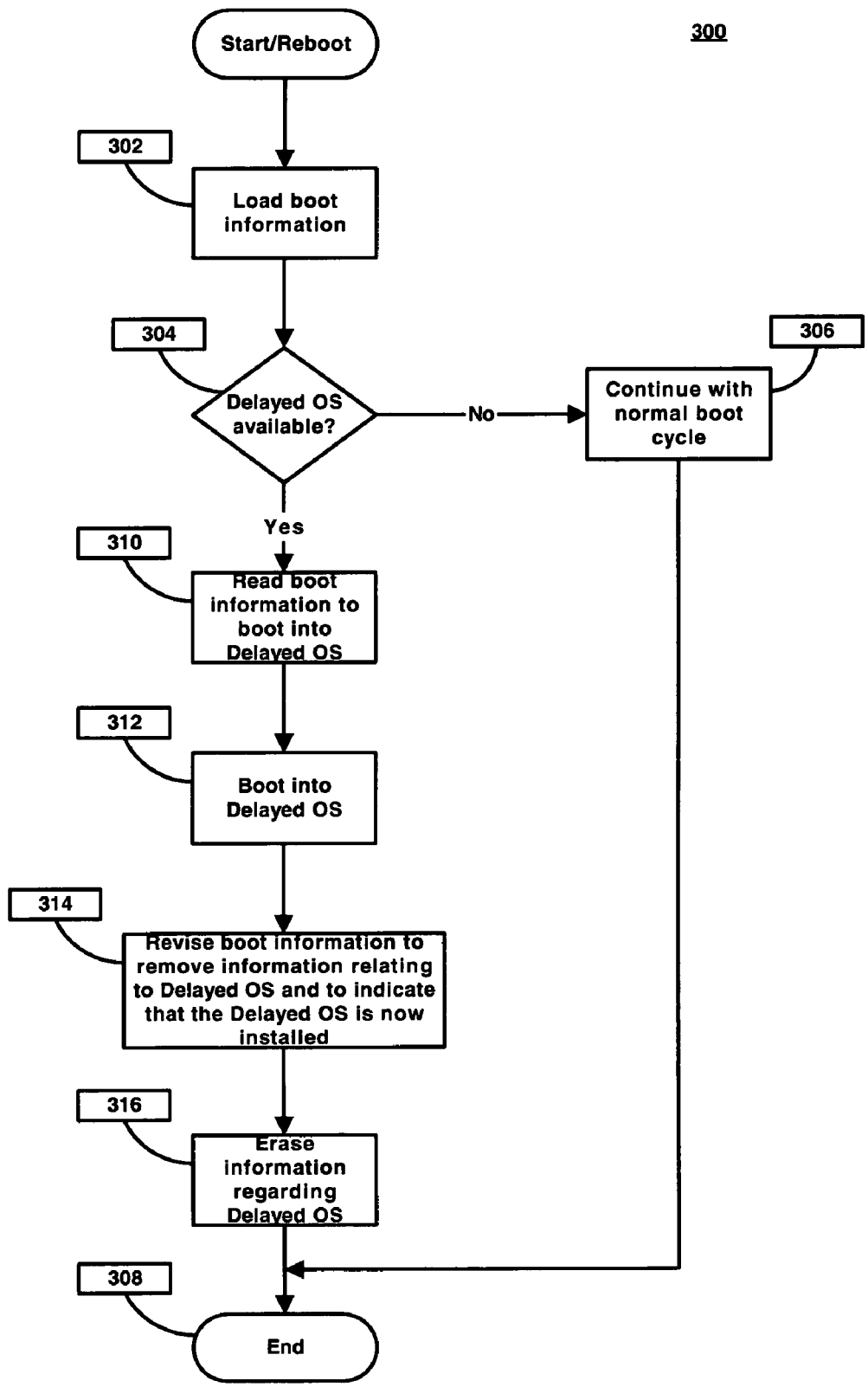
FIG. 3 is a flowchart of a method of a boot process when a delayed upgrade has been installed.

A method 300 for booting into the Delayed OS is shown in FIG. 3. The method 300 is invoked when the system reboots, and begins by loading the boot information (step 302). During a boot cycle, a computer system looks to a particular location (either in memory or on a disk; e.g., the BSA) to find the information needed to boot up the system. The boot information is examined to determine if a Delayed OS is available (step 304). For example, if a flag was set in the boot area of the system (in step 104 of the method 100), that flag could be checked to see if it is set. If no Delayed OS is available, then the system continues with its normal boot cycle (step 306) and the method terminates (step 308).

If there is a Delayed OS available (step 304), then the boot information is read in order for the system to boot into the Delayed OS (step 310) and the system boots into the Delayed OS (step 312). Once the Delayed OS is installed (as shown in FIG. 1), any reboot will be into the Delayed OS, which then becomes the running OS. The boot information is revised to remove information relating to the Delayed OS and to indicate that the Delayed OS is now installed (step 314). The information relating to the Delayed OS is removed because the Delayed OS is only booted into once. Pointers to the installed OS are adjusted to point to the Delayed OS. The information regarding the Delayed OS (i.e., the pointer used to locate the Delayed OS file) is no longer needed and is erased (step 316), and the method terminates (step 308). If a flag has been used to indicate the presence of a Delayed OS, that flag is reset in either step 314 or 316. To simplify the boot process, the information relating to the Delayed OS is removed from the boot information and replaces the boot information regarding the currently running OS.

EXAMPLE

Figure 4A:
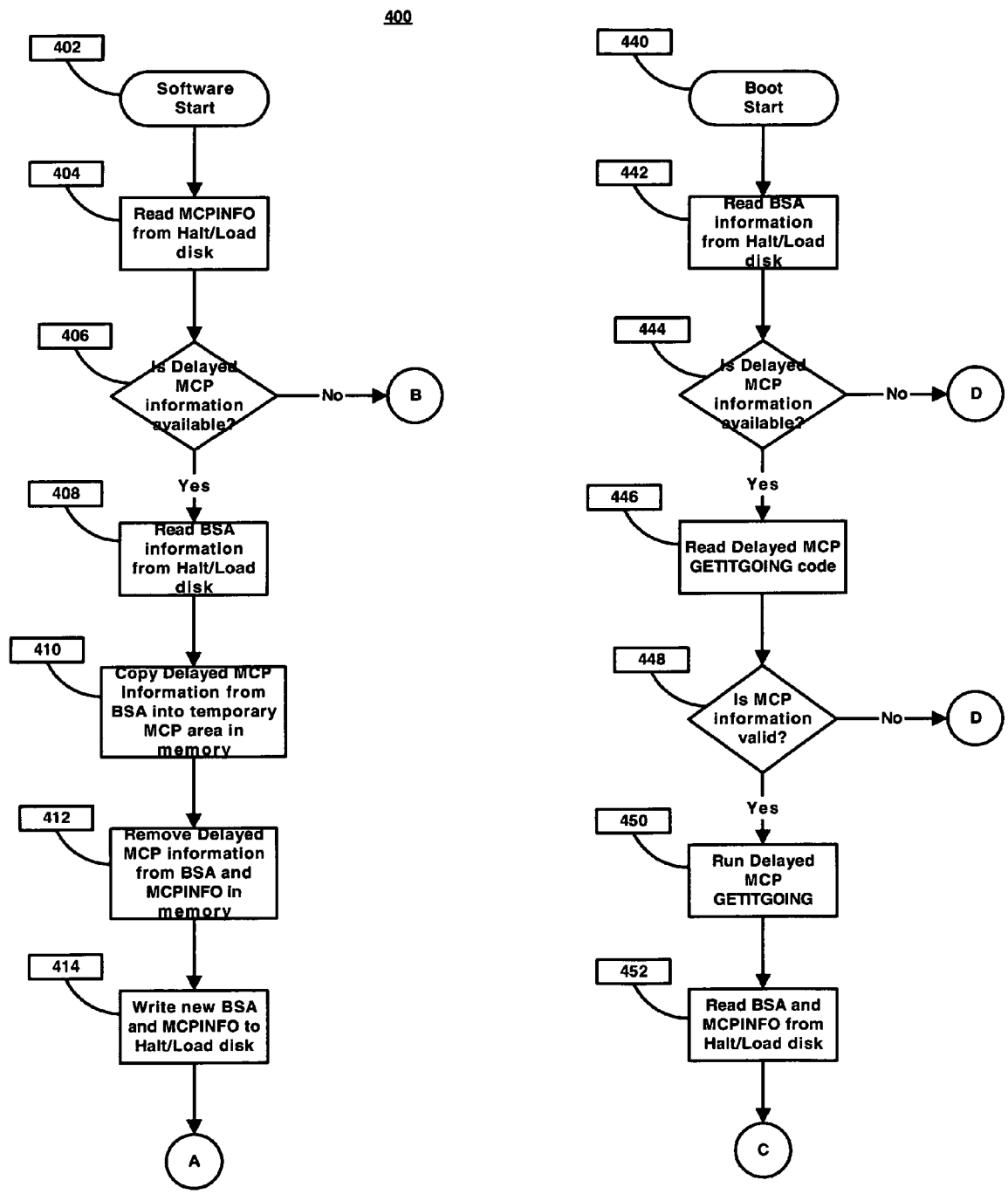
FIGS. 4a-4b show a flowchart of the method shown in FIG. 3 as applied to the MCP operating system.
Figure 4B:
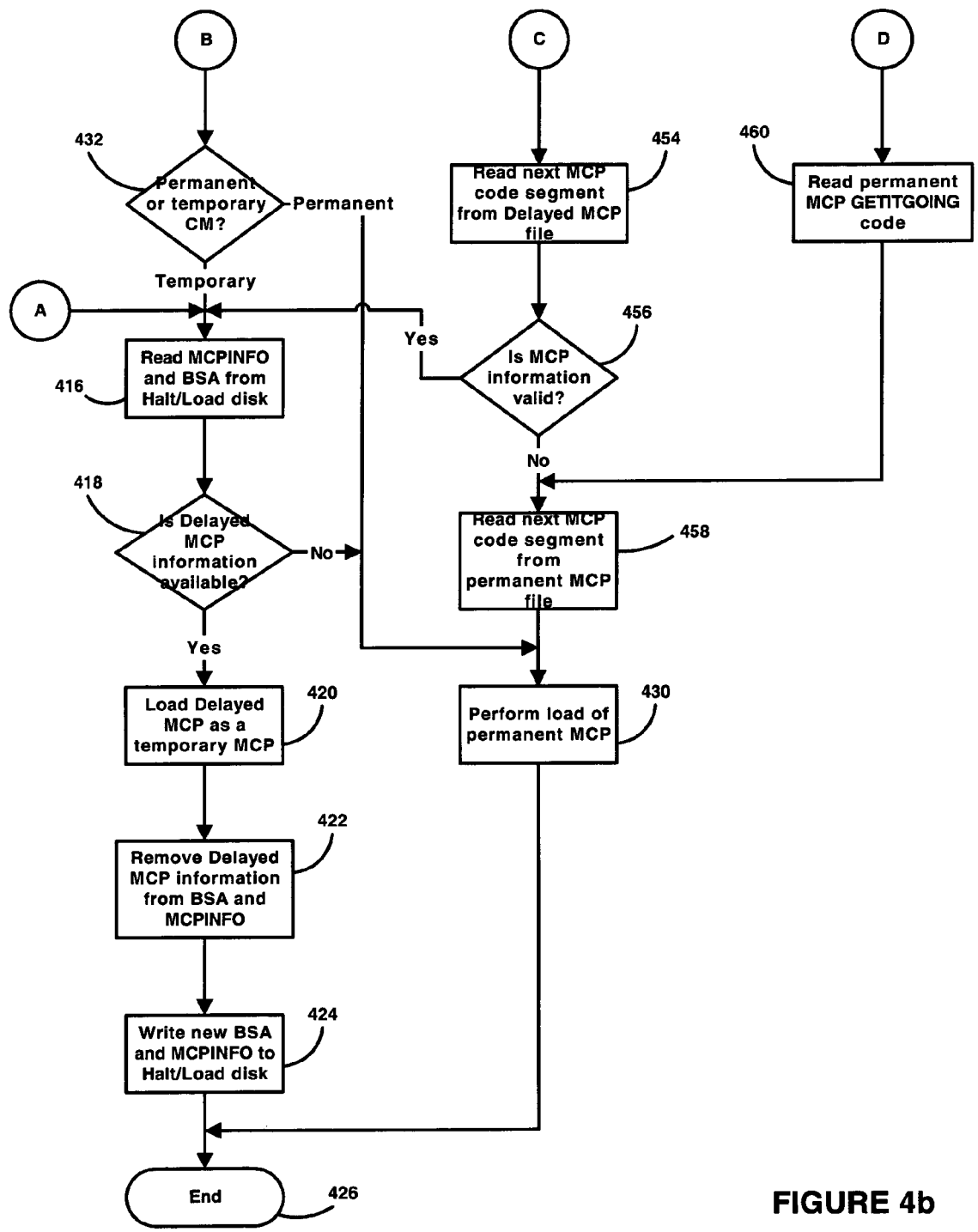

An example of the method 300 as applied to the MCP OS is shown as a method 400 in FIGS. 4a-4b. However, the inventive principles disclosed herein can be applied to any OS. The method 400 can be invoked in two ways: by a software start (step 402) or by a boot start (step 440). A software start occurs when MCP initiates the process, and a boot start occurs upon a console start (i.e., after a hard system crash).

After a software start (step 402), the MCPINFO array is read from the Halt/Load disk (step 404). The MCPINFO array is checked to determine if Delayed MCP information is available (step 406). If there is a pending Delayed MCP, then the BSA information is read from the Halt/Load disk (step 408). The Delayed MCP information is copied from the BSA into a temporary MCP area in memory (step 410). This step is performed because the Delayed MCP is going to be run as a temporary MCP, for reasons previously described.

The Delayed MCP information is removed from the BSA and the MCPINFO array in memory (step 412). Because the Delayed MCP has been loaded and the Delayed MCP is only booted into once, this information can be removed. The new BSA and MCPINFO array (without the Delayed MCP information) are written to the Halt/Load disk (step 414) and the MCPINFO array and the BSA are read from the Halt/Load disk (step 416).

Next, the MCPINFO array is examined to determine whether Delayed MCP information is available (step 418). If Delayed MCP information is available, then the Delayed MCP is loaded as a temporary MCP (step 420). The Delayed MCP information is removed from the BSA and the MCPINFO array (step 422) and the new BSA and MCPINFO array (without the Delayed MCP information) are written to the Halt/Load disk (step 424). The method then terminates (step 426).

If there is no Delayed MCP information available (step 418), then the permanent MCP is loaded (step 430) and the method terminates (step 426). If there is no Delayed MCP information available (step 406), then a determination is made whether the CM is for a permanent CM or a temporary CM (step 432). If it is a temporary CM, then the MCPINFO array and the BSA are read from the Halt/Load disk (step 416) and the method continues as described above. If the CM is a permanent CM (step 432), then the permanent MCP is loaded (step 430) and the method terminates (step 426).

After a boot start (step 440), the BSA information is read from the Halt/Load disk (step 442). The BSA information is examined to determine if Delayed MCP information is available (step 444). If Delayed MCP information is available, then the Delayed MCP GETITGOING code is read (step 446). The MCP GETITGOING code is part of the MCP boot cycle, and includes the MCP OS loading more of itself. A check is made whether the MCP information is valid (step 448). This step includes a set of sanity checks performed on the MCP file, regardless of the type of MCP file being examined (either permanent, temporary, or delayed).

If the MCP information is valid, then the Delayed MCP GETITGOING code is run (step 450). The BSA and MCPINFO array are read from the Halt/Load disk (step 452). The next MCP code segment from the Delayed MCP file is read (step 454) and is evaluated to determine whether the MCP information is valid (step 456). If the MCP information is valid, then the MCPINFO array and the BSA are read from the Halt/Load disk (step 416) and the method continues as described above. If the MCP information is not valid (step 456), then the next MCP code segment is read from the permanent MCP file (step 458), the permanent MCP is loaded (step 430), and the method terminates (step 426).

If Delayed MCP information is not available (step 444) or if the MCP information after reading the Delayed MCP GETITGOING code is not valid (step 448), then the permanent MCP GETITGOING code is read (step 460). The next MCP code segment is read from the permanent MCP file (step 458), the permanent MCP is loaded (step 430), and the method terminates (step 426).

Modified MCP Loader Procedure

Figure 5:
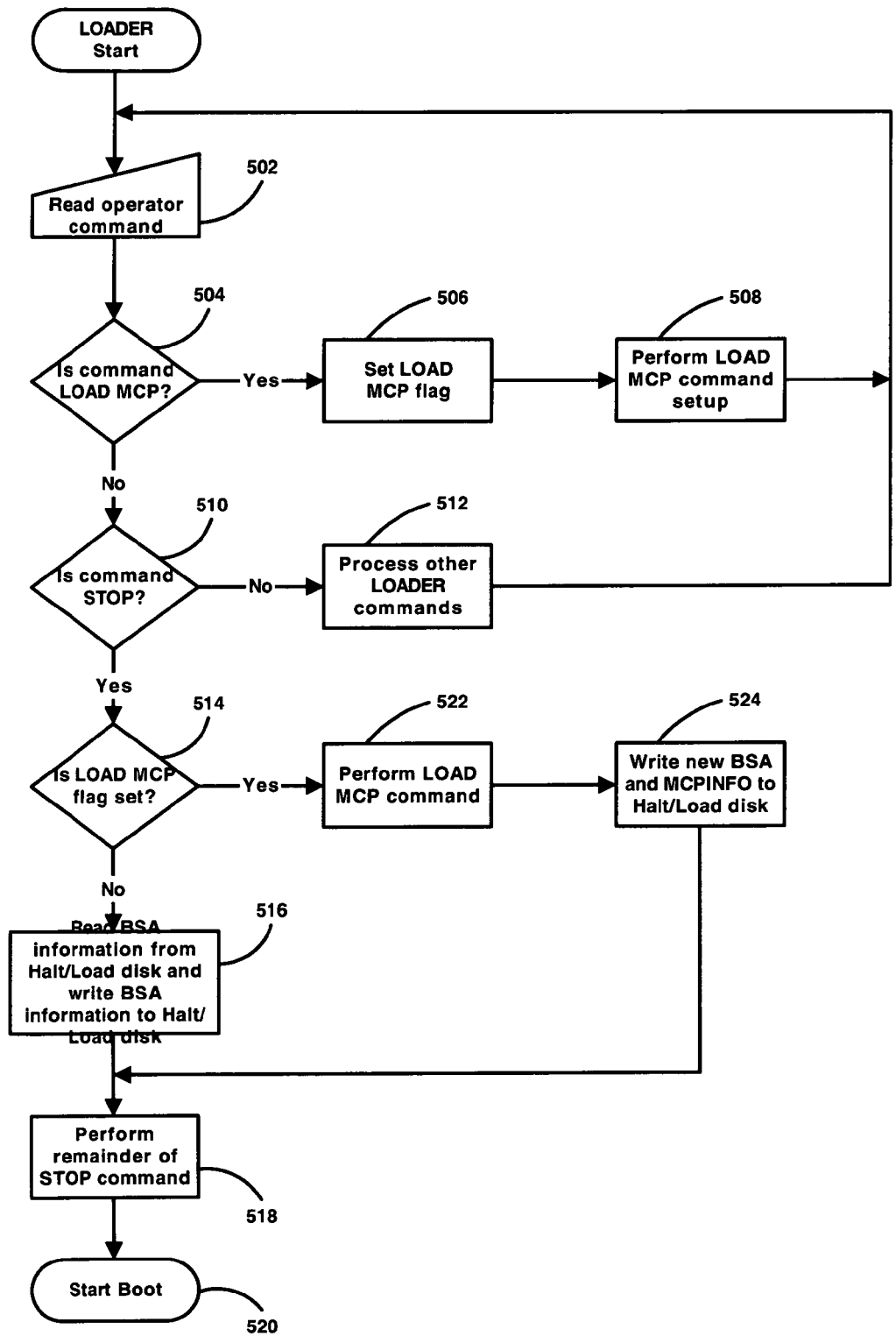
FIG. 5 is a flowchart of a method of the LOADER program in the MCP operating system modified to incorporate the method shown in FIG. 4.

In the MCP OS, the LOADER program is also modified to handle the Delayed OS, and is shown in FIG. 5 as a method 500. The LOADER program is used to load the MCP OS onto a system. The method 500 begins by reading an operator command (step 502). If the command is LOAD MCP (step 504), a LOAD MCP flag is set in memory (step 506), the LOAD MCP command setup is performed (step 508), and the system reads the next operator command (step 502).

If the command is not LOAD MCP (step 504), then the command is examined to determine if it is a STOP command (step 510). If it is not a STOP command, then the LOADER command is processed (step 512) and the system reads the next operator command (step 502).

If the command is a STOP command (step 510), then a determination is made whether the LOAD MCP flag is set (step 514). If the LOAD MCP flag is not set, then the BSA information is read from the Halt/Load disk and is written back to the Halt/Load disk (step 516). The remainder of the STOP command is performed (step 518) and the system begins the boot process (step 520).

If the LOAD MCP flag is set (step 514), the LOAD MCP command is performed (step 522). When the LOAD MCP flag is set, this is an indication that the user has specified a particular MCP file to be loaded, and therefore the system uses the specified file and not any information that is stored in the BSA on disk. The new BSA and MCPINFO array are written to the Halt/Load disk (step 524). Since the user has specified an MCP file to load, the BSA and MCPINFO array are built in memory from scratch and then written to disk. Although there could be information in the BSA relating to a Delayed OS, this information is no longer needed and can be overwritten. The remainder of the STOP command is performed (step 518) and the boot process is started (step 520).

System Embodying the Present Invention

A system 600 constructed in accordance with the present invention is shown in FIGS. 6a-6d. The system 600 includes a disk 602, a boot process 604, and a memory 606 with a temporary OS boot pointer 608. The disk 602 includes a boot strap area 610 that contains two pointers: a permanent OS boot pointer 612 and a Delayed OS boot pointer 614. The disk 602 also includes OS files OS1 616 and OS2 618.

Figure 6A:
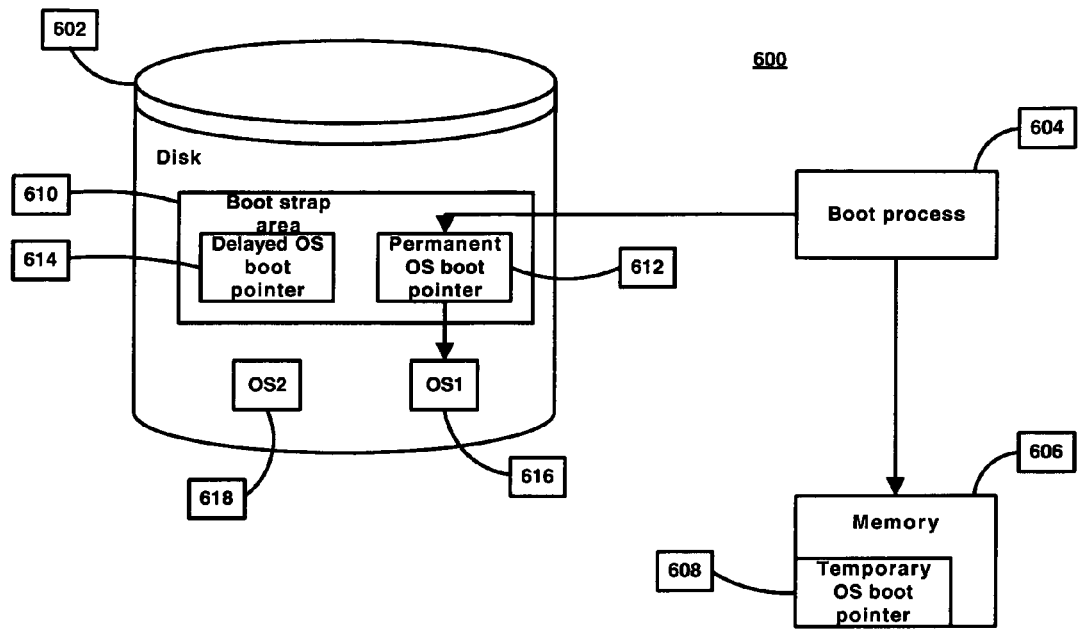
FIG. 6a is a block diagram of a system embodying the present invention after the delayed operating system upgrade has been copied to the system disk and prior to installing the delayed upgrade.

FIG. 6a shows the system 600 after the Delayed OS (OS2 618) has been copied to the disk 602 and prior to the Delayed OS being installed.

Figure 6B:
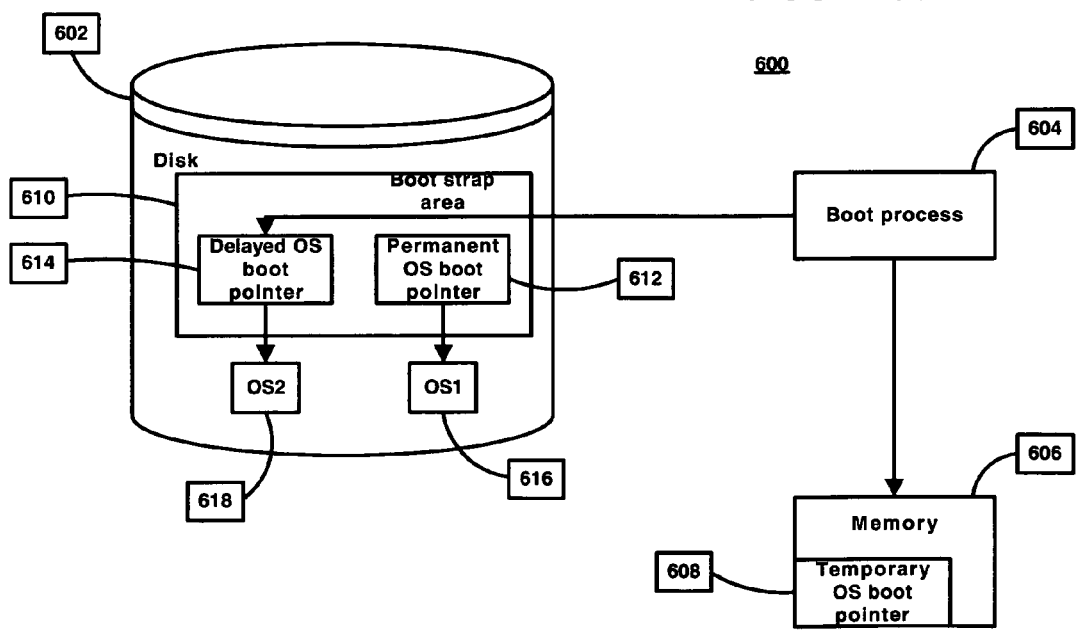
FIG. 6b is a block diagram of the system shown in FIG. 6a after the delayed upgrade is installed.

FIG. 6b shows the system 600 after the Delayed OS has been installed, but before the Delayed OS has been booted into. The Delayed OS boot pointer 614 is set to point to OS2 618 (the Delayed OS file) and the boot process 604 changes its pointer to point to the Delayed OS boot pointer 614. The boot process 604 changes its pointer because on the next system boot, the system 600 will boot into the Delayed OS.

Figure 6C:
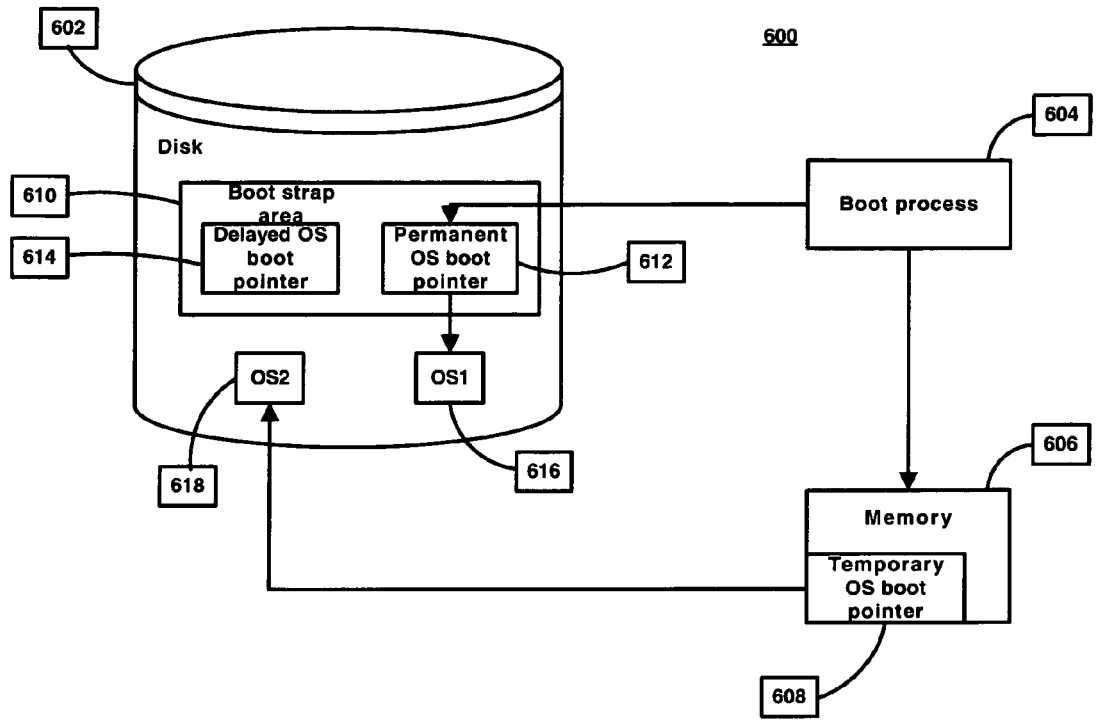
FIG. 6c is a block diagram of the system shown in FIG. 6b after the delayed upgrade has been booted into as a temporary operating system.

FIG. 6c shows the system 600 after the Delayed OS has been booted into as a temporary OS. The temporary OS boot pointer 608 is set to point to OS2 618 (the Delayed OS file). This is accomplished by copying the Delayed OS boot pointer 614 into the temporary OS boot pointer 608. On boot, the boot process 604 looks to the memory 606 to access the temporary OS boot pointer 608. The Delayed OS boot pointer 614 is cleared, since there is no longer a Delayed OS. The boot process 604 changes its pointer to point to the permanent OS boot pointer 612, since the Delayed OS is only booted into once and any subsequent boot of the system 600 will be into the permanent OS.

Figure 6D:
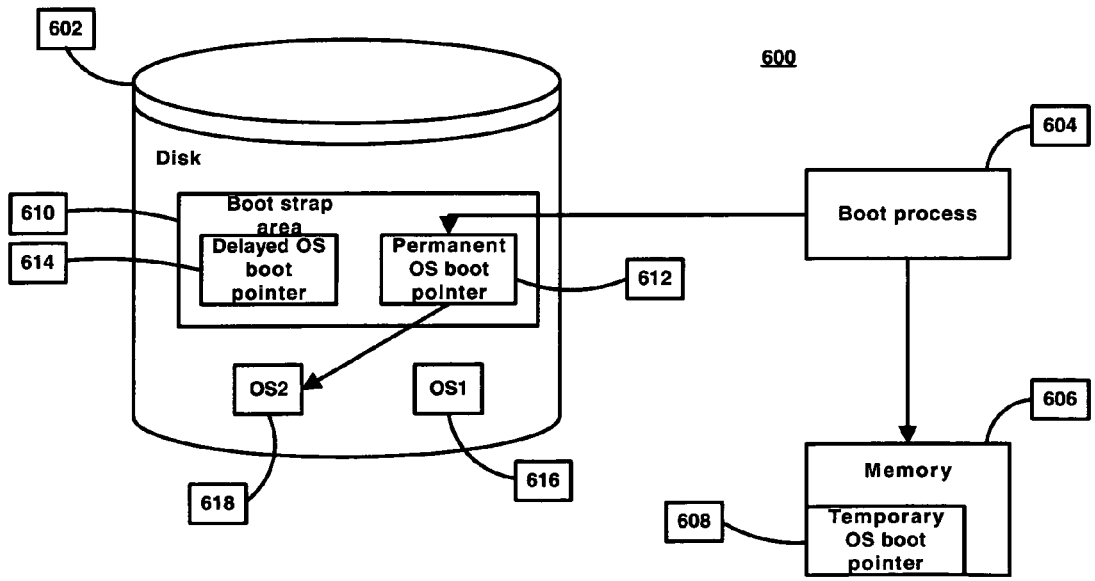
FIG. 6d is a block diagram of the system shown in FIG. 6c after the delayed upgrade has been made the permanent operating system.

FIG. 6d shows the system 600 after the Delayed OS has been made the permanent OS for the system 600. The permanent OS boot pointer 612 is changed to point to OS2 618 (the Delayed OS file). The temporary OS boot pointer 608 is cleared, because there is no longer a temporary OS. As OS1 616 will no longer be used by the system 600, it can be erased. The next time the system 600 boots, the boot process 604 will access the permanent OS boot pointer 612, which now points to OS2 618 (the Delayed OS file).

It is noted that the present invention may be implemented in a variety of systems and that the various techniques described herein may be implemented in hardware or software, or a combination of both. Although the features and elements of the present invention are described in the preferred embodiments in particular combinations, each feature or element can be used alone (without the other features and elements of the preferred embodiments) or in various combinations with or without other features and elements of the present invention. While specific embodiments of the present invention have been shown and described, many modifications and variations could be made by one skilled in the art without departing from the scope of the invention. The above description serves to illustrate and not limit the particular invention in any way.

What is claimed is:

1. A method for specifying an operating system (OS) version to use in a computing system after a system reboot, comprising the steps of:

copying at least one new OS file to a system disk, wherein each new OS file is a different version of the same OS;

selecting an OS version to be installed from the at least one new OS files on disk;

rebooting the system into the selected OS version, whereby the selected OS version becomes the currently running OS version on the system; and updating a boot pointer on the system disk to point to the selected OS file, such that any subsequent reboot will be into the selected OS version,
wherein only one system reboot is needed to change the currently running OS version.

2. The method according to claim 1, further comprising the steps of:
setting a pointer in a memory on the system to point to the selected OS file; and
changing a boot pointer in a boot process of the system to point to the pointer in memory, the setting step and the changing step being performed prior to the booting step, wherein the boot process accesses the pointer in memory to boot into the selected OS file.

3. The method according to claim 2, wherein the selected OS version is booted into as a temporary OS, such that the system can revert to an OS version that was running prior to the booting step.

4. The method according to claim 3, wherein the temporary OS can be made permanent.

5. The method according to claim 1, wherein the selecting step includes setting an indicator to indicate that an OS file has been selected to be installed.

6. The method according to claim 5, wherein
the booting step examines the indicator, and
if the indicator indicates that the selected OS file is present, then booting into the selected OS file;
if the indicator indicates that selected new OS file is not present, then booting into the current OS version.

7. The method according to claim 6, wherein the indicator is a pointer in a memory of the system and the presence of the selected OS file is indicated if the pointer contains a valid value.

8. A system for implementing a delayed switch from a first operating system (OS) version to a second OS version in a computing system after a reboot the system comprising:

a disk having a first OS file corresponding to the first OS version, a second OS file corresponding to the second OS version wherein the second OS file is installed while the system is running the first OS version, and a boot strap area with a pointer, said pointer pointing to the first OS file; and a boot process, wherein after the second OS file is installed, said pointer is updated to point to the second OS file wherein said pointer is being updated while the system is running the first OS version, such that on a system reboot, said boot process accesses said pointer in said boot strap area to load the second OS version, whereby the system is switched from the first OS version to the second OS version using only one system reboot.

9. The system according to claim 8, wherein the second OS version is booted into as a temporary OS, such that the system can revert to the first OS version.

10. The system according to claim 9, wherein the temporary OS can be made permanent.

11. The system according to claim 8, further comprising an indicator stored on said disk, said indicator indicating the presence of the second OS file.

12. The system according to claim 11, wherein
said boot process examines said indicator during a system reboot, and
if said indicator indicates that the second OS file is present on said disk, said boot process loads the second OS file;
if said indicator indicates that the second OS file is not present on said disk, said boot process loads the first OS file.

13. The system according to claim 12, wherein said indicator is said pointer and the presence of the second OS file is indicated if said pointer contains a valid value.

* * * * *